Feb. 23, 1932.    M. P. FERRELL    1,846,678
SPEED MEASURING APPARATUS
Filed April 29, 1926

Inventor
Myron P. Ferrell
by H. A. Vattum
Att'y.

Patented Feb. 23, 1932

1,846,678

UNITED STATES PATENT OFFICE

MYRON P. FERRELL, OF BERWYN, ILLINOIS, ASSIGNOR TO WESTERN ELECTRIC COMPANY, INCORPORATED, OF NEW YORK, N. Y., A CORPORATION OF NEW YORK

SPEED MEASURING APPARATUS

Application filed April 29, 1926. Serial No. 105,498.

This invention relates to speed measuring apparatus, and has for its principal object the provision of an improved and simplified apparatus for accurately measuring the speed of bodies moving at relatively high speeds.

In accordance with the general features of the invention, one embodiment thereof comprises an improved apparatus for measuring high speeds of rotation, wherein a permanent magnet is positioned adjacent a rotating mechanism whose speed is to be determined, the rotating mechanism being provided adjacent the magnet with a portion of material differing magnetically therefrom. An inductor coil associated with the magnet is connected with one winding of a double winding telephone receiver or ear phone, the other winding of the receiver being connected with an adjustable oscillatory circuit. The oscillatory circuit is adjusted until the beats heard in the receiver are of maximum duration, the speed of the rotating mechanism being then determined by suitable calibrations associated with the oscillatory circuit. Means are provided so that the sound emitted by the receiver due to either the oscillatory circuit or the mechanism being tested may be interrupted for comparing the musical octave of each of the sounds.

Figure 1:
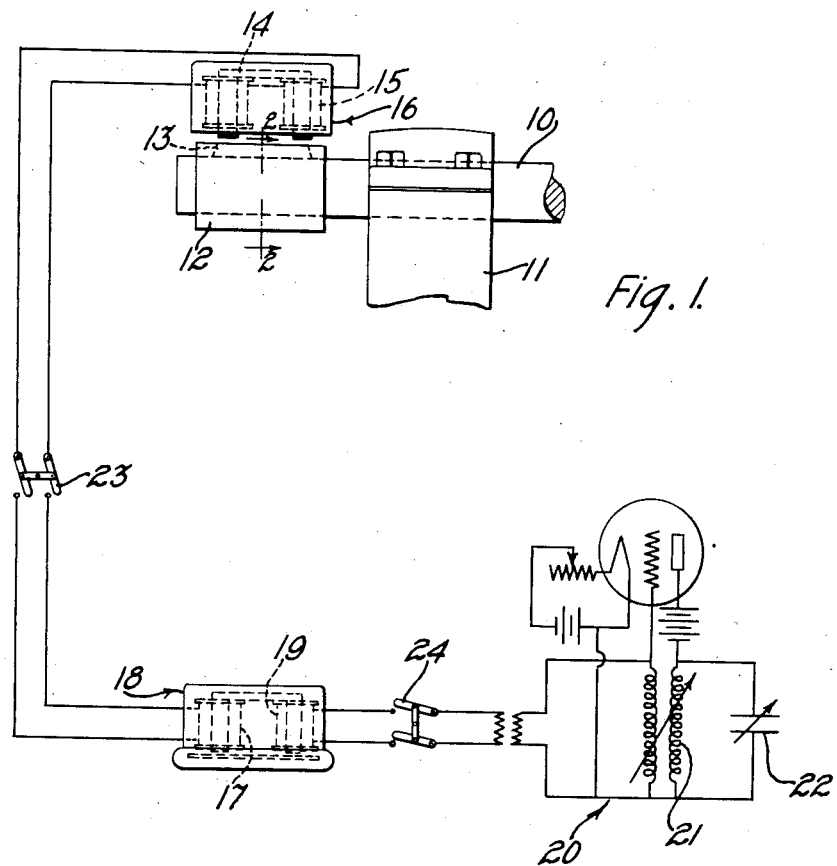
Figure 2:
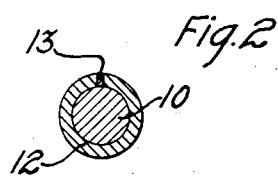

Other features and advantages of the invention will become apparent in the following description, reference being had to the accompanying drawings, wherein Fig. 1 illustrates, diagrammatically, a preferred arrangement of a speed measuring apparatus embodying the features of the invention, and Fig. 2 is a detail section on line 2—2 of Fig. 1.

Referring now to the drawings, the numeral 10 designates a portion of a shaft or other rotating member, the speed of which is to be determined. In the present instance the shaft 10 is shown as rotatably journaled in a bearing 11. Suitably secured to the shaft or rotating member 10 is a bushing 12 having an insert 13 of material differing magnetically from that of the shaft and the bushing. Positioned adjacent the insert 13 is a permanent magnet 14 having associated therewith an inductor coil 15. In the practice of this invention it has been found suitable for this purpose to use an ordinary watch case telephone receiver 16 with the cap and diaphragm removed. The inductor coil 15 is connected with one winding 17 of a split winding electromagnetic receiver or ear phone 18, a second winding 19 of the receiver 18 being connected with a suitable oscillatory circuit 20 which may be adjusted, as by means of an adjustable inductance 21 and a variable condenser 22, to develop sounds in the receiver 18 in accordance with alterations of various known frequencies. By virtue of this arrangement, it will be understood that rotation of the shaft 10 will induce alternations of current in the inductor coil 15 and that the frequency of such alternations is dependent upon the rotating speed of the shaft. Furthermore, the alternations thus engendered will develop a sound in the receiver 18 varying in frequency in accordance with the frequency of the alternations. It will therefore be apparent that the rotation of the shaft 10 will develop a sound in the receiver 18 that may be united with a sound of known frequency developed therein from known rotative speeds by means of the oscillatory circuit. Furthermore, it is obvious that variations in the frequencies of the two sounds will be audible in the receiver 18 in the form of beats. The oscillatory circuit is adjusted until such beats become of maximum duration and gradually disappear. This condition, which may be described as a blending of the two sounds by a blending of the alternations electrically, indicates that the alternations produced by the rotating shaft and the oscillatory circuit coincide. However, such a condition might exist when the two sounds are of different frequencies, as for instance, when the sounds are in different musical octaves. In order to determine whether the sound produced by the rotating shaft is in the same musical octave as the sound produced by the oscillatory circuit, switches 23 and 24 are provided so that the sound developed by either the oscillatory circuit or the shaft may be interrupted for comparison.

Having adjusted the oscillatory circuit until the beats heard in the receiver 18 have become of maximum duration and having ascertained that the sounds produced by the oscillatory circuit 20 and the rotating shaft 10 are in the same octave, the speed of the shaft may be readily and accurately determined with the aid of suitable calibrations associated with the adjustable inductance and variable condenser of the oscillatory circuit.

Although the invention has been described in connection with a specific embodiment thereof particularly adapted for measuring the speed of rotation of a body, it is to be understood that the invention may be used in many other connections and take a variety of forms.

What is claimed is:

1. In an apparatus for measuring the speed of a moving body, means controlled by the body for producing alternations of electrical current, means for producing electrical alternations of known frequency including means for varying the frequency of said alternations, and means for uniting the alternations to produce a beat sound.

2. In an apparatus for measuring the speed of a moving body, means including an inductor coil associated with the body for producing alternations of electrical current, an oscillatory circuit for producing alternations of known frequency including means for varying the frequency of said alternations, and a split winding electromagnetic receiver for combining said alternations and emitting a beat sound.

3. In an apparatus for measuring the speeds of moving bodies, means readily secured to various moving bodies, a circuit controlled by said means for producing alternations of an electric current, an oscillatory circuit for providing alternations of known frequency, means for combining the two alternations, a diaphragm responsive to the combination, and means for adjusting the oscillatory circuit until beats of the diaphragm are of maximum duration.

4. In an apparatus for measuring the speed of a moving body, means for producing electrical alternations of known frequency, means for producing electrical alternations responsive to the speed of the moving body, means for electrically blending the two alternations into beats, and means for varying the alternations of known frequency until the beats are of maximum duration to indicate the speed.

5. In an apparatus for measuring the speed of a moving body, means for producing electrical alternations of known frequency, means for producing electrical alternations responsive to the speed of the moving body, means for electrically blending the two alternations into beats, and means for selectively interrupting the alternations of known frequency and the alternations responsive to the moving body to determine if the sounds produced by them are in the same musical octave.

In witness whereof, I hereunto subscribe my name this sixteenth day of April, A. D. 1926.

MYRON P. FERRELL.